United States Patent [19]
Coulbeck

[11] 3,907,248
[45] Sept. 23, 1975

[54] STOPCOCKS

[75] Inventor: Maxwell Glover Coulbeck, Christchurch, New Zealand

[73] Assignee: M. G. Coulbeck Limited, Wellington, New Zealand

[22] Filed: July 20, 1973

[21] Appl. No.: 380,947

[52] U.S. Cl. ............... 251/30; 251/31; 251/44
[51] Int. Cl.² ............ F16K 31/383; F16K 31/02
[58] Field of Search ........... 251/31, 30, 61.5, 61.6, 251/62, 44

[56] References Cited
UNITED STATES PATENTS

| | | | |
|---|---|---|---|
| 2,098,696 | 11/1937 | Sparrow | 251/31 X |
| 2,577,391 | 12/1951 | Williams | 251/30 X |
| 2,605,079 | 7/1952 | Miller et al. | 251/31 X |
| 2,975,800 | 3/1961 | Doelger et al. | 251/31 X |

FOREIGN PATENTS OR APPLICATIONS

| | | | |
|---|---|---|---|
| 1,267,882 | 6/1961 | France | 251/31 |

*Primary Examiner*—Arnold Rosenthal
*Attorney, Agent, or Firm*—Anthony J. Casella

[57] ABSTRACT

The invention comprises a stopcock assembly for controlling fluid flow, particularly water, and has an inlet and an outlet for the passage of fluid, a valve unit interposed between the inlet and outlet and having a valve and a valve seat and a valve stem extending from the valve and connected to a piston within a chamber separated from the main fluid flow area of the stopcock assembly, and manual or electric solenoid operated means for directing fluid to either side of the chamber for effecting movement of the valve stem and thus movement of the valve away from or towards the valve seat to permit or prevent flow of fluid through the stopcock.

3 Claims, 3 Drawing Figures

3,907,248

STOPCOCKS

This invention relates to stopcocks, particularly the larger variety, for use in controlling the flow of fluids, e.g. gas or water.

An object of this invention is to provide a hydraulically operable stopcock assembly of relatively simple construction whilst being efficient and positive in operation. Other objects and advantages of the invention will become apparent from the ensuing description.

According to this invention therefor, there is provided a stopcock assembly having an inlet and an outlet for the passage of fluids, a division including a valve seat between the inlet and outlet, a valve movable onto and away from the valve seat and having a valve stem connected to a piston within a chamber separated from the main fluid flow area of the stopcock assembly, there being means for directing fluid to either side of the piston within its chamber for moving said piston and moving the connected valve onto or away from the valve seat.

Figure 1:
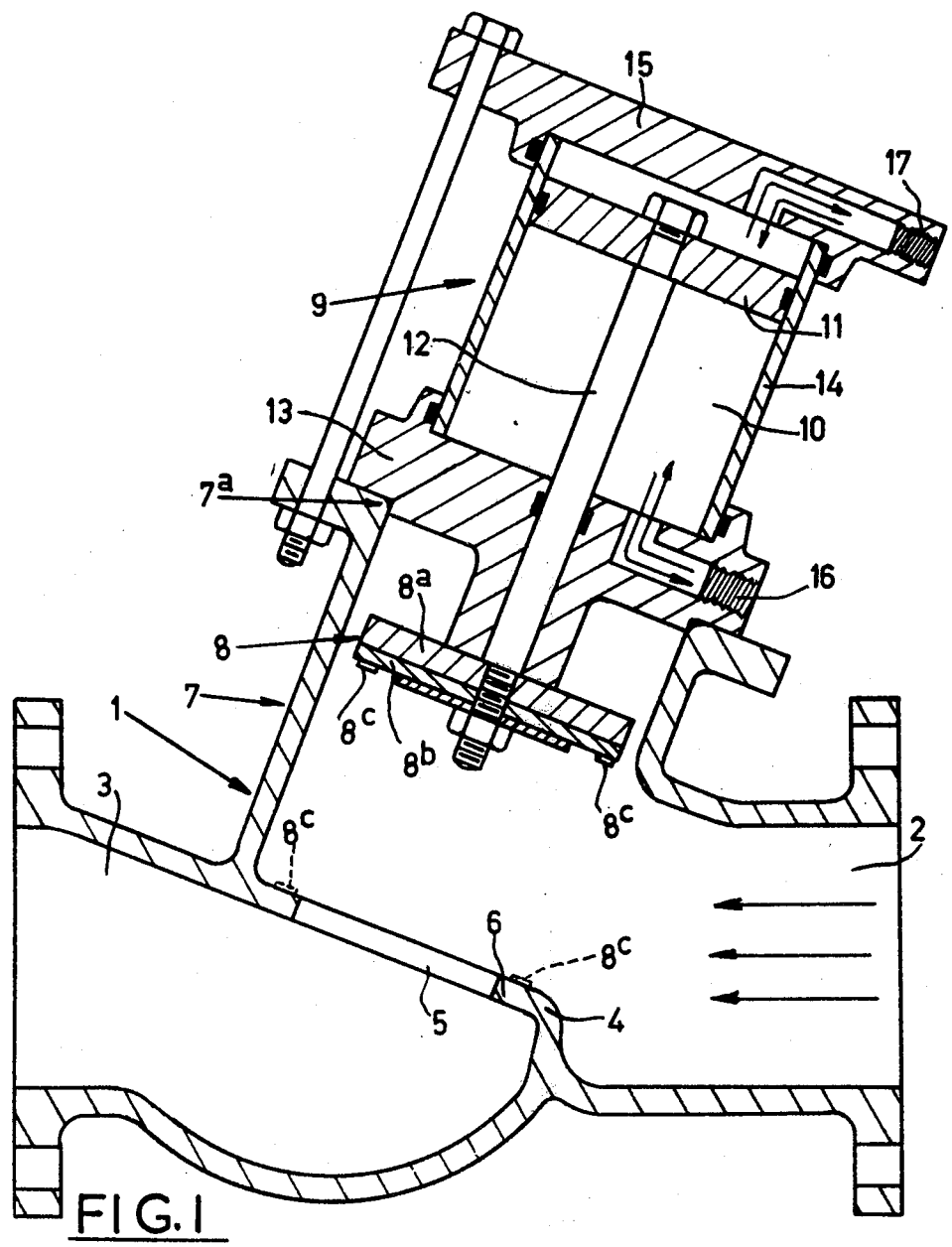

The invention will now be described by way of example with reference to the accompanying drawings in which FIG. 1 is a cross-sectional view of a first form of stopcock assembly in accordance with the invention.

Figure 2:
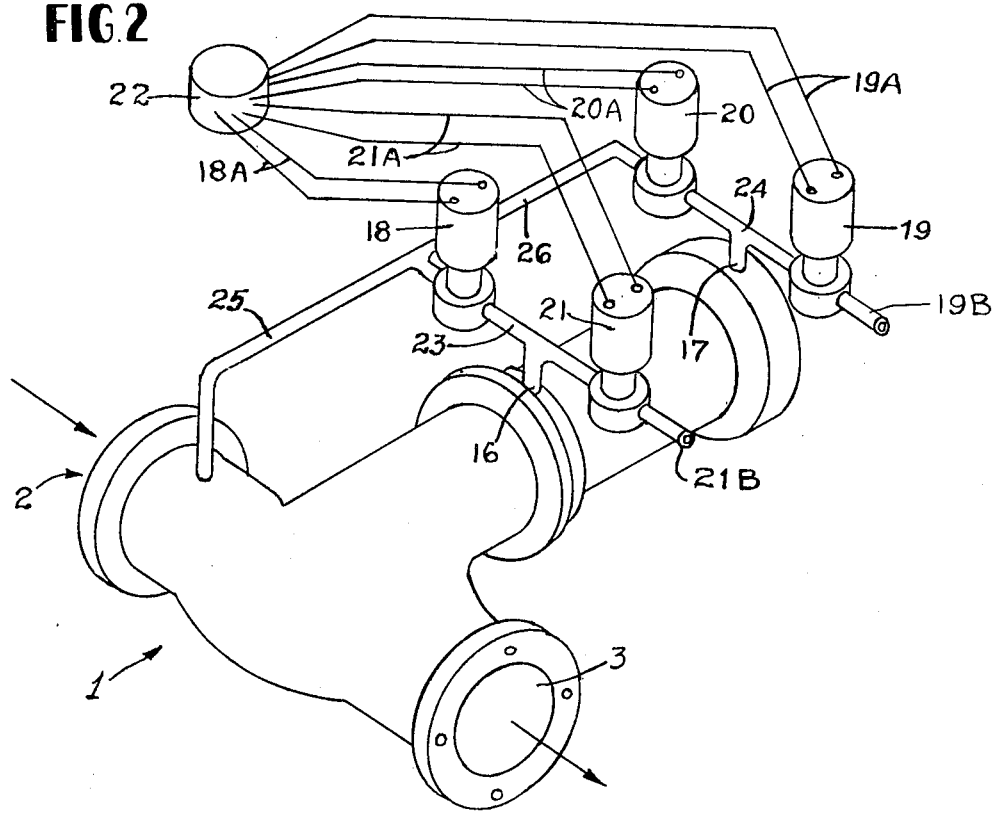
Figure 3:
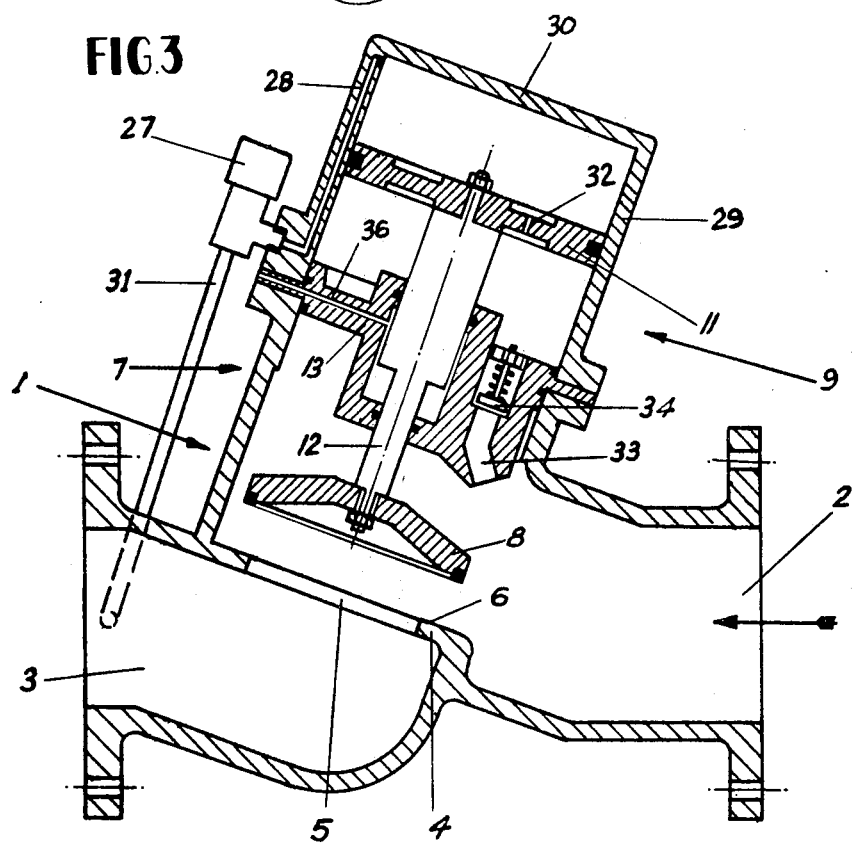

FIG. 2 is a perspective view illustrating a means for directing fluid flow to either side of the valve actuating piston within its chamber for moving the said piston and moving the connected valve onto or away from its valve seat, and FIG. 3 is a cross-sectional view illustrating a modified or further form of stopcock with fluid directing means, in accordance with the invention.

In the first form of the invention (referring firstly to FIG. 1 of the drawings), the stopcock assembly includes a main valve housing, generally indicated by the arrow 1, having an inlet 2 at one end and an outlet 3 at the other end. The inlet and outlet may be generally co-axial and the construction of the housing 1 includes an inclined dividing wall 4 between the inlet 2 and the outlet 3 of the assembly.

The dividing wall 4 is inclined relative to the main axis of the assembly and has a valve aperture 5 with a surrounding valve seat 6, the valve seat being on the inlet side of the dividing wall 4.

The housing has an outwardly directed junction piece 7 extending in a line generally perpendicular to the line of the dividing wall 4 at the valve opening 5 so as to be co-axial with the valve opening, and the valve is normally disposed within the junction piece 7, co-axially therewith, so as to be movable axially onto and away from the valve seat 6 on the inlet side of the dividing wall 4.

The valve 8 may include a rigid backing plate 8a and an inner resilient disc 8b which can make a resilient seal onto the valve seat 6. Either the valve seat 6 or the inner face of the resilient disc 8b can be provided with an annual rib or like projection 8c to assist in forming a positive seal when the valve 8 is closed onto the valve seat 6.

A housing extension, generally indicated by the arrow 9 extends outwardly from and in line with the housing junction to provide a cylindrical chamber 10 housing a reciprocal piston member 11, the piston member 11 being connected to the valve 8 by a valve stem 12 so that reciprocation of the piston 11 within the chamber 10 can effect reciprocation of the valve 8 towards and away from the valve seat 6 in opening and closing the valve or stopcock.

The housing extension 9 may comprise a flanged boss portion 13 sealably engaged with a flanged portion 7a of the housing junction 7 and the valve stem 12 is slidably located through the flanged boss portion 13; a cylindrical member such as a length of tube 14 provides the cylinder wall 4 of the chamber 10 and the outer end of the chamber is sealed by an end plate 15 engaged with the cylinder 14.

The piston 11 within its chamber 10 is arranged to be moved therein by means of fluid pressure, for example by water pressure, and (as in this first illustrated form of the invention) inlet/exit passages 16 and 17 can be provided in the flanged boss plate 13 and end plate 15 for the housing extension 9 so as to provide communicating passages with the chamber 10 on either side of the piston and with a source of fluid pressure supply. The fluid pressure supply for actuating the piston 11 may be switched to either inlet/exit passage 16 or 17 such as by the actuation of solenoid operated valve or a manual control valve so that when fluid under pressure is passed through the inlet 17 of the end plate 15 the piston is moved towards the flanged boss plate 13 and thus the valve 8 is moved towards and onto the valve seat 6 to close the stopcock and prevent passage of fluid through the stopcock. When the solenoid or manual valve is operated to redirect the flow of fluid under pressure through the inlet 16 of the flanged boss 13, the piston 11 is then urged towards the outer end of its chamber 10 to thus move the valve 8 away from the valve seat 6 and open the valve to permit passage of fluid through the valve opening 5 to the outlet 3. The arrangement provides that when the valve 8 is moved to the fully closed position on the valve seat 6, the pressure of fluid on the inlet side of the stopcock will hold the valve 8 in its closed position.

Referring now to FIG. 2 of the drawings, the means for controlling the flow of fluid to either side of the chamber 10, may comprise four electric solenoid operated control valves 18, 19, 20 and 21. The solenoid valves 18, 19, 20 and 21 may be conveniently disposed in a rectangular formation towards one side of the stopcock and power may be supplied thereto from a central junction box 22 by way of electrical conduits 18a,19a,20a and 21a a main power supply lead (not shown) passing to the junction box 22.

Two solenoid valves 18 and 21 are disposed on each end of the branches of a first T-junction pipe 23 coupled to inlet/exit passage 16 of the stopcock and the other two solenoid valves 19 and 20 are coupled to the branch ends of a second T-junction pipe 24 coupled to inlet/exit passage 17 at the other end of the piston chamber 10.

Fluid under pressure is arranged to be supplied to the first solenoid valve 18 on the first T-junction pipe 23 such as by way of a communicating pipe 25 coupled to the inlet side 2 of the stopcock; and the same fluid under pressure is arranged also to be supplied to one of the solenoid valves 20 on the second or other T-junction pipe 24 such as by way of a communicating pipe 26 between solenoid valves 18 and 20, solenoid valves 18 and 20 may thus be regarded as the inlet valves and solenoid valves 19 and 21 regarded as the outlet or discharge valves-solenoid valves 19 and 21 are provided with discharge apertures 19b and 21b whereby fluid can be discharged from the chamber 10; for the valve actuating piston 11.

The electrical arrangement for the solenoid valves 18, 19, 20 and 21 provides that solenoid valves 18 and 19 are actuable together so as to be opened together or closed together and solenoid valves 20 and 21 are actuable together so as to be opened together or closed together. Thus in operation of the stopcock assembly, solenoid valves 18 and 19 may be opened together and solenoid valves 20 and 21 closed together so that fluid under pressure may pass by way of connection pipe 25 through solenoid valve 18 and through the first T-junction pipe 23 and inlet/exit passage 16 to the lower side of the chamber 10, or side between the piston 11 and boss portion 13 of the stopcock, so that the piston 11 may be urged towards the outer end of the stopcock assembly, i.e., towards the end plate 15. As this first operation takes place solenoid valve 20 is closed to prevent fluid passing to the other end of the chamber, solenoid valve 21 is closed to prevent discharge of fluid from the first T-junction pipe 23 and solenoid valve 19 is open so that any fluid in the upper part of the chamber 10 between the piston 11 and end plate 15 may be discharged through inlet/exit 17 in the end plate 15 and out through second T-junction pipe 24 and discharge solenoid valve 19. The valve 8 is thus open to permit flow of fluid through the stopcock.

When it is desired to stop the flow of fluid through the stopcock, valve 8 may be closed by switching the electric power supply to close solenoid valves 18 and 19 and open solenoid valves 20 and 21. Closure of inlet solenoid valve 18 and opening of inlet solenoid valve 20 permits the fluid under pressure to pass through communicating feed pipes 25 and 26 and through the second T-junction pipe 24 to the outer end of the chamber 10 between the piston 11 and end plate 15 to thus urge the piston 11 towards the flanged boss plate 13 and move the valve 8 towards and onto its valve seat 6 in closing the stopcock; discharge solenoid valve 19 prevents escape of fluid at the outer end of the stopcock from the second T-junction pipe 24, and opening of the discharge solenoid valve 21 permits discharge solenoid valve 21 permits discharge of fluid from the portion of chamber between the piston 11 and flanged boss plate 13 by way of inlet/exit passage 16 and the first T-junction pipe 23.

Referring now to FIG. 3 of the accompanying drawings, modifications may include a single simplified solenoid control unit 27 with a single solenoid operated valve interposed between a passage 28 opening to the upper of outer part of the chamber 10 between the piston 11 and closed outer end of the housing extension 9 in FIG. 3 the housing extension 9 has a cylindrical wall part 29 with an integral outer end wall 30 — this "blind cylinder" arrangement may also be substituted for the separable tube 14 and end plate 15 described and illustrated in FIGS. 1 and 2 and a passage 31 opening to the "downstream" or outlet side of the main housing 1. The unit 27 can be mounted on the housing extension 9 and the passage 28 can extend through the cylindrical wall part 29, passage 31 being by way of an external pipe. The piston 11 is provided with a small cross-section bleed passage 32 providing limited communication between both parts of chamber 10 to either side of the piston 11, and the flanged boss portion 13 is also provided with by-pass passage 33 which is of larger cross section than the bleed passage 32 and is closable by a one way valve 34 whereby some fluid in the "upstream" or inlet side of the main housing 1 can be by-passed to the portion of chamber 10 between the piston 11 and flanged boss portion 13. The one way valve 34 eliminates water hammer in closing the valve 8.

Thus, in operation of this modified form of the invention, with the valve 8 closed on its seat 6 and the piston 11 towards the flanged boss portion 13, fluid under pressure from the inlet side of the main housing 1 can be by-passed through by-pass passage 33 and bleed passage 32 to fill the chamber 10 at both sides of the piston 11; due to the effective piston area being less on the lower side (or side nearest the flanged boss portion 13) then the outer or upper side because of the area occupied by the valve stem 12, a pressure differential is provided and the valve 8 is biased to remain closed. On actuation of solenoid unit 27 to open to valve thereof, passage 28 is placed in communication with passage 31 to relieve the pressure on the outer or upper side of the piston 11 by allowing the fluid in the chamber 10 outer or upper part to escape to the downstream or outlet side of the main housing 1. Due to passage 33 being larger in cross-section than the bleed passage 32, and the valve 8 being smaller in diameter than the piston 11, the pressure below the piston 11 (between the piston 11 and the flanged boss part 13) urges the piston 11 outwardly towards end wall 30 and thus lifts the valve 8 off its seat 6 to permit full flow of fluid through the valve opening 5 and outlet 3. In closing the stopcock, solenoid valve unit 27 is closed and fluid under pressure allowed to build up in the chamber outer part between the piston 11 and end wall 30 until the pressure differential again becomes greater in such chamber outer part and the piston 11 is urged back towards the flanged boss part 13 in closing the valve 8 on its seat 6. The speed of closing off the valve 8 is determined by the bleed passage 32 cross-section and effective areas on both sides of the piston 11; in this latter regard, the valve stem 12 can be of stepped formation and have the portion connected to the piston 11 of larger diameter than the portion connected to the valve 8, and the medial stepped portion of the valve stem 12 can be located in a chamber 35 provided in the flanged boss part 13 and open to atmosphere by way of a laterally extending passage 36 in the flanged boss part 13, appropriate seals being provided for the valve stem 12 above and below the chamber 35.

The stopcock according to this invention is particularly suitable for use in providing water for watering such as golf courses, bowling greens and the like and the electric solenoid arrangement of control valves may provide for electric power to be supplied to actuate them by manual actuation of an electric power supply switch, as desired, and/or by suitable timing mechanism so that the solenoid valves 18, 19, 20 and 21 may be periodically actuated. Other power supply switching mechanisms can be provided according to particular requirements.

Thus it will be seen that there is provided a simple and effective hydraulically valve or stopcock assembly capable of positive action and having a minimum of wearing parts. Particular forms of the invention have been described and illustrated by way of example but it will be appreciated that other variations of and modifications to the invention can take place without departing from the scope of the appended claims.

I claim:

1. A valve control assembly having inlet and outlet conduits for the passage of fluids, a valve seat between the inlet and outlet conduits, a valve movable onto or away from the valve seat, and a valve stem secured to said seat; the improvement comprising:
a. a cylindrical chamber separated from the valve conduits and in axial alignment with the valve stem, and a piston within the chamber secured to the valve stem for moving the valve onto or away from the valve seat;
b. a first control means for closing the valve including a first control conduit connected between the inlet conduit and an opening into an outer side of said piston for moving the piston, the valve stem, and the valve toward the valve seat to close the valve, and an electric solenoid operated valve connected in series with the first control conduit for operating the first control means;
c. a second control means for opening the valve including a second control conduit connected between the inlet conduit and an opening into an inner side of said piston for moving the piston, the valve stem, and the valve away from the valve seat to open the valve, and an electric solenoid operated valve connected in series with the second control conduit for operating the second control means;
d. a first discharge valve, operated by an electric solenoid, connected to the second control conduit for discharging fluid from the cylinder when the valve is being closed; and
e. a second discharge valve, operated by an electric solenoid, connected to the first control conduit for discharging fluid from the cylinder when the valve is being opened.

2. A valve assembly according to claim 1 wherein the inlet and outlet conduits are co-axial in a main housing and the valve seat is positioned in an inclined plane between the inlet and outlet conduits.

3. A valve assembly according to claim 1 wherein the piston and chamber are positioned within a separable housing extension comprising a flanged boss in sealing engagement with the inlet and outlet conduits through which the valve stem is slidably located.

* * * * *